United States Patent
Engelbrecht et al.

(10) Patent No.: US 6,840,464 B2
(45) Date of Patent: Jan. 11, 2005

(54) TANK RINSE STRUCTURE FOR AN AGRICULTURAL SPRAYER

(75) Inventors: Joshua Jacob Engelbrecht, Ankeny, IA (US); Michael Dean Fugate, Des Moines, IA (US); Kent Alvin Klemme, Ankeny, IA (US)

(73) Assignee: Deere & Company, Moline, IL (US)

( * ) Notice: Subject to any disclaimer, the term of this patent is extended or adjusted under 35 U.S.C. 154(b) by 31 days.

(21) Appl. No.: 10/272,975

(22) Filed: Oct. 15, 2002

(65) Prior Publication Data

US 2004/0069871 A1 Apr. 15, 2004

(51) Int. Cl.$^7$ ............................................... B05B 1/26
(52) U.S. Cl. ................................... 239/461; 239/518
(58) Field of Search ........................... 239/461, 482, 239/495, 510, 512, 518, 521, 523

(56) References Cited

U.S. PATENT DOCUMENTS 4,568,022 A * 2/1986 Scrivnor ..................... 239/207
5,033,492 A * 7/1991 Mertens et al. ........... 134/166 R
5,125,576 A   6/1992 Ziegenbein ................. 239/113
6,036,118 A   3/2000 Walker et al. .............. 239/518

OTHER PUBLICATIONS

Page 2–5 of Ag–Chem Equipment brochure 503024–F, date of publication—1999.

Commercially available Ag–Chem rinse nozzle, date of publication—unknown.

* cited by examiner

*Primary Examiner*—Thomas Denion
*Assistant Examiner*—Zelalem Eshete

(57) ABSTRACT

A stationary rinse nozzle made of durable, non-corrosive material includes a simple deflector directing a uniform water jet in all directions so the need for a rotating nozzle or a multi-apertured rinse tube is eliminated. A large rinse orifice provides the necessary volume of water for effective low pressure rinsing of residual products from the tank walls. The deflector support is located in the middle of a tube so that blank spots in the spray pattern are avoided.

14 Claims, 2 Drawing Sheets

US 6,840,464 B2

TANK RINSE STRUCTURE FOR AN AGRICULTURAL SPRAYER

FIELD OF THE INVENTION

The present invention relates generally to agricultural sprayers and, more specifically, to rinse structure for a tank on such a sprayer.

BACKGROUND OF THE INVENTION

Agricultural sprayers include one or more tanks for containing a chemical solution for application to a crop or the ground. The solution tank must be thoroughly rinsed after use, particularly if the sprayer is going to be stored for a period of time or if a different chemical solution is to be applied in subsequent spraying operations. Heretofore, structures for rinsing the tank have presented several problems. One type of structure includes rotating rinse nozzles for spraying water on the tank sides. The rotating nozzles typically provide only a low rinse water flow rate at high pressure and are ineffective for fast, complete tank rinsing. The rotating mechanism requires vanes and bearings and often seizes up as a result of particles in the rinse water. Seizure can also result from being submerged in the chemical solution. Once the nozzle seizes and stops rotating, rinsing becomes less complete and less effective.

In another type of structure, rinse nozzles or tubes lined with holes are placed around the top of the solution tank. Although such structures are less prone to plugging than the rotating mechanisms, the finite number of nozzles or holes in the tube do not provide for complete, effective coverage of the sides to be rinsed. In addition, the rotating mechanisms and the tube or nozzle rinse structures are very expensive to manufacture and usually require high pressure for removing residual products from the tank walls.

SUMMARY OF THE INVENTION

It is therefore an object of the present invention to provide an improved rinse structure for the solution tank of an agricultural sprayer. It is a further object to provide such a structure which overcomes most or all of the aforementioned problems.

It is another object of the present invention to provide an improved rinse structure for the solution tank of an agricultural sprayer which is simpler and more reliable than at least most previously available rinse structures. It is a further object to provide such a structure which eliminates problems of seizure and ineffective coverage. It is yet another object to provide such a structure with a substantially longer life than most rinse structures.

In an embodiment of the invention, a stationary nozzle made of durable, non-corrosive material such as stainless steel includes a simple deflector directing a uniform water jet in all directions obviating the need for bearings and vanes to produce nozzle rotation, thereby eliminating a source of expense and problems. A large rinse orifice provides the necessary volume of water for effective rinsing of residual products from the tank walls without requiring high pressure. The orifice is relatively free from plugging problems caused by particles in the rinse solution. The thin, flat deflector support is located in the middle of a rinse tube. The flat support has a width at the tube outlet less than the diameter of the outlet and connects to the central portion of the deflector so that blank spots in the spray pattern are avoided. In the embodiment shown, the deflector is supported in a concave upwardly attitude from the top of a spray tank.

These and other objects, features and advantages of the present invention will become apparent upon reading the following detailed description in view of the drawings.

DESCRIPTION OF THE PREFERRED EMBODIMENT

Figure 1:
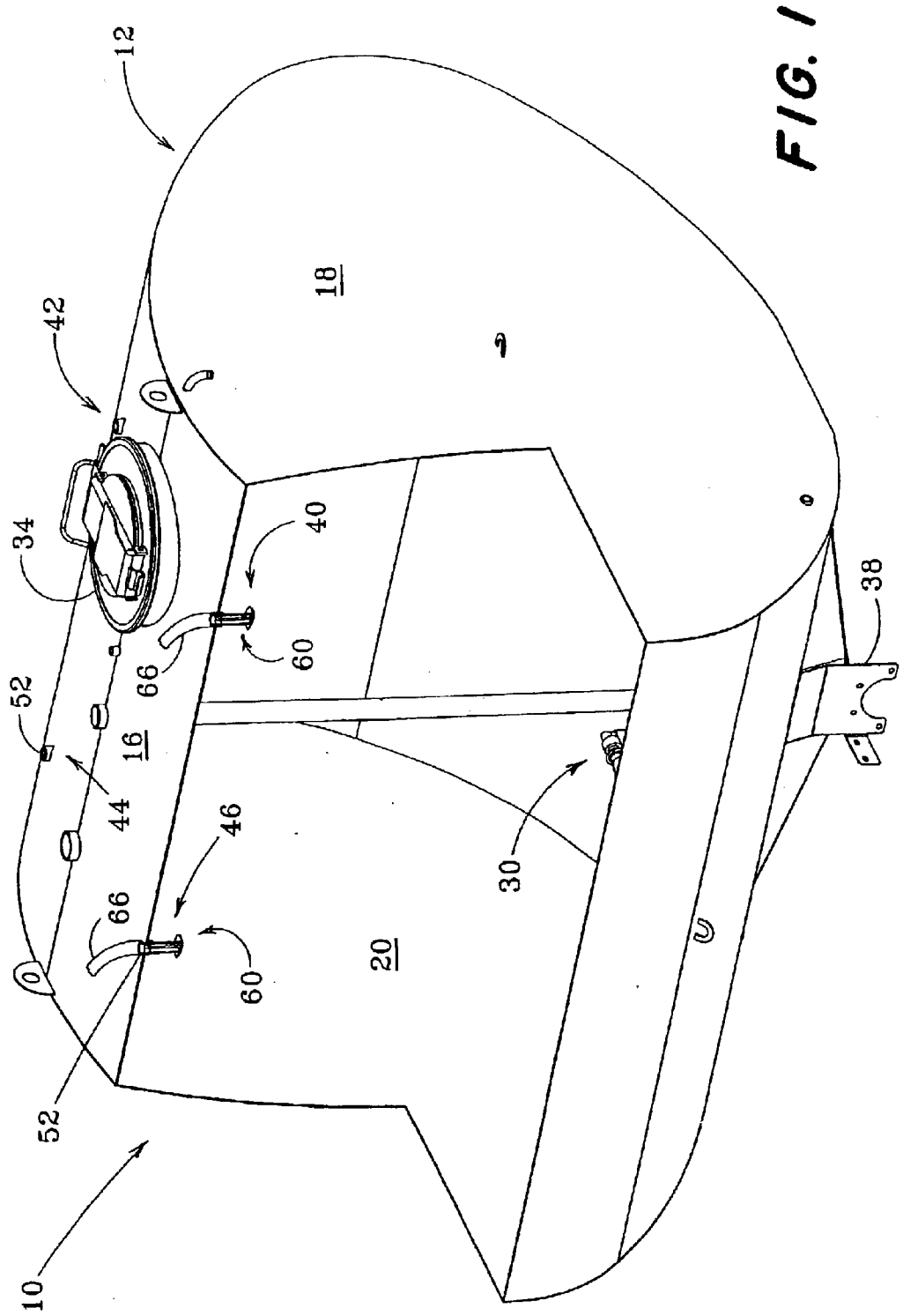
FIG. 1 is a perspective view of a portion of an agricultural sprayer solution tank, partially broken away to better show the rinse nozzles.

Referring now to FIG. 1, therein is shown a portion of an agricultural sprayer 10 having a solution tank 12 adapted for containing a chemical solution to be applied. The tank may be of conventional construction and includes a central wall portion 16 connecting transversely spaced end wall portions 18 and 20. A baffle or divider (not shown) may be provided at a central location within the tank walls between the end wall portions 18 and 20. Plumbing structure indicated generally at 30 facilitates various standard spraying operations including tank filling, solution recirculation, and spraying. An access door 34 is hinged to the upper portion of the tank 12. Bracket structure indicated at 38 mounts plumbing on the bottom of the tank 12. The tank 12 is carried by saddle or tank support structure on the sprayer frame (not shown) of the sprayer 10 for forward movement over a field to be sprayed.

To provide a rinsing function for the inside wall portions 16, 18 and 20 and for the sides of any baffle structure in the tank 12, rinse nozzle structures indicated generally at 40, 42, 44 and 46 are supported inside the tank 12 from offset locations at the top of the central wall portion 16. Four nozzle structures are shown, but it is to be understood that the number and location of the structures can be varied depending on the tank configuration. The rinse nozzle structures 40–46 are generally identical so only the nozzle structure 40 will be described in detail.

The nozzle structure 40 depends from a line inlet or tank connector 52 supported at the top of the tank. The connectors 52 for the tank 12 of FIG. 1 are generally located above each tank quadrant centrally between the end wall portions 18 or 20. Each connector 52 receives and supports a nozzle structure 40 having a deflector assembly 60 located closely adjacent the top of the tank 12. The inlets or tank connectors 52 are connected to a source of low pressure rinse solution through supply lines 66. The rinse solution may simply be water.

Figure 3:
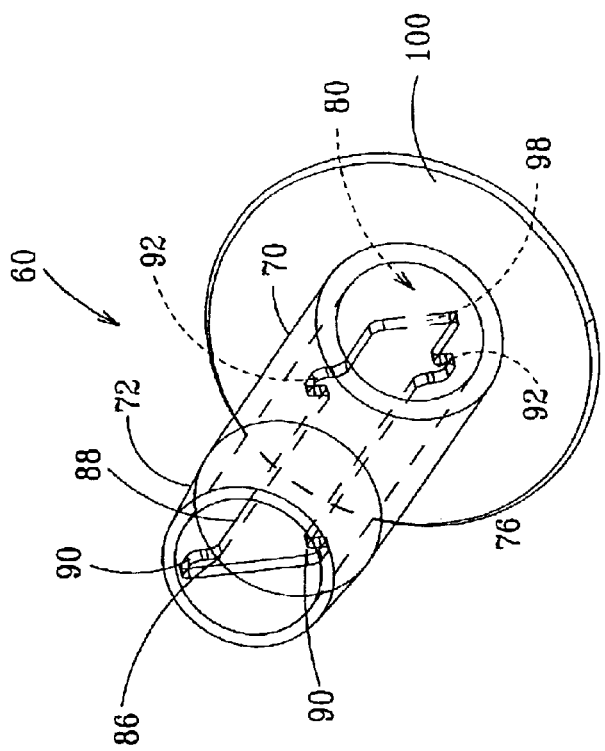
FIG. 3 is a perspective view of the nozzle of FIG. 2 illustrating the deflector support structure for providing a generally uninterrupted curtain of rinse solution.
Figure 2:
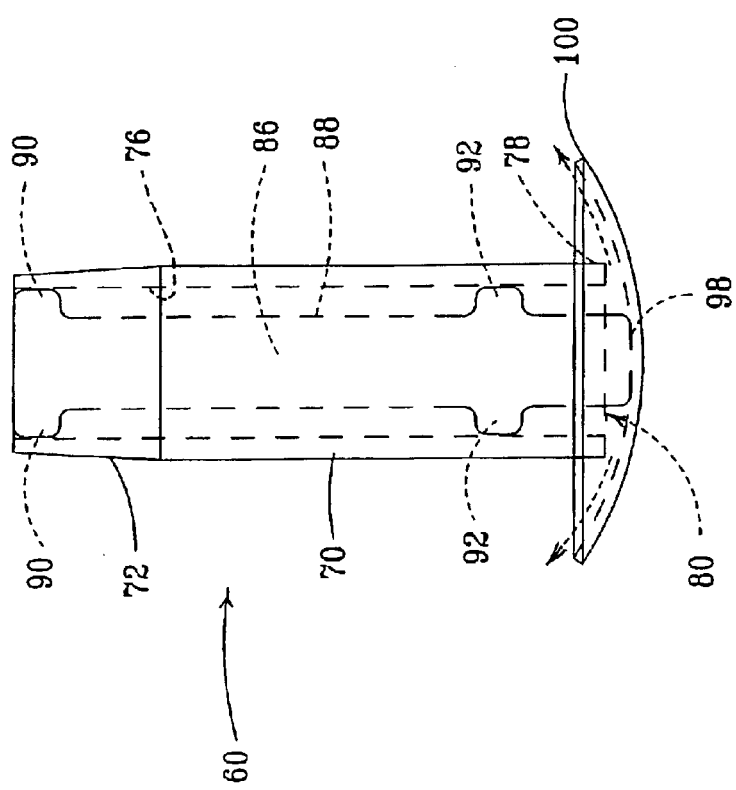
FIG. 2 is a plan view of the rinse nozzle utilized with the tank of FIG. 1.

Referring now to FIGS. 2 and 3, the deflector assembly 60 includes a cylindrical body 70 terminating in an inwardly tapered connecting end 72. A cylindrical bore 76 extends all the way through the body 70 and defines an outlet end 78 opposite the connecting end 72. The outlet end 78 includes a relatively unrestricted high volume outlet area 80 facilitating high flow of rinse fluid at low pressures.

The deflector assembly 60 also includes a thin flat deflector support 86 located within the bore 76. The support 86 has an elongated, axially extending body 88 of width less than the diameter of the bore 76. Upper ears 90 project from the body 88 to extend the width of the support 86 to approximately equal the diameter of the bore 76 at the end 72. Similarly, ears 92 extend the width of the lower portion of the support 86 at a location offset above the outlet area 80 to support the lower portion within the bore 76 without interrupting the flow pattern of the rinse fluid exiting the bore. The deflector assembly can be fabricated from a long-lasting and anticorrosive material such as stainless steel, and the support 86 can be welded at the ears 90 and 92 to the walls of the bore 76. The lower portion of the support 86 extends downwardly from the outlet area 80 to a central connection at 98 with a circular, concave deflector 100.

As shown in FIGS. 2 and 3, the deflector 100 is concave upwardly and intercepts fluid exiting the outlet area 80. The deflector 100 had a diameter on the order of twice the diameter of the cylindrical body 70. In the embodiment shown, the body 70 has a diameter of slightly greater than one inch (26.8 mm) and the body 88 of the support 86 is approximately half an inch (12.7 mm). The diameter of the bore 76 is about seven-eighths of an inch (21 mm). The thin centrally located support 86, which only partially bridges the outlet area 80 and has only a relatively narrow connecting area at the center of the deflector 100, eliminates any interference that would result in voids in the spray pattern from the deflector assembly 60 to inside surfaces of the tank 12. The end 72 facilitates securing of the assembly 60 to the connector 52. The end may be threaded for receipt by the connector 52, or a hose and hose clamp or other suitable arrangement can be utilized for the mounting the assembly. As shown, the distance between the end 72 and the deflector 100 is relatively small and on the order of only several inches so that the deflector is closely adjacent the tank wall.

When rinsing of the inner tank surfaces is desired, low pressure (on the order of 20 psi) rinse fluid is directed through the supply lines 66 to the assemblies 60. Higher pressure rinse, on the order of 100 psi or more, may be used but are not necessary for effective operation. A generally uninterrupted curtain of high volume, low pressure rinse fluid is projected upwardly and outwardly from each concave deflector 100 to thoroughly rinse all the inside surfaces of the tank.

Having described the preferred embodiment, it will become apparent that various modifications can be made without departing from the scope of the invention as defined in the accompanying claims.

What is claimed is:

1. Rinse structure for the solution tank of an agricultural sprayer having walls with inside surfaces subject to accumulation of residue from chemicals, the rinse structure comprising:
   a source of pressurized rinse;
   a rinse tube connected to the pressurized rinse and having a circular outlet of first diameter providing a high capacity flow rate along an egress path;
   a concave circular deflection member of second diameter greater than the first diameter supported within the tank between the walls and having a generally solid concave portion, the solid concave portion being non-annular and extending generally continuously across the second diameter and intercepting the egress path to provide a continuous high volume sheet of rinse fluid for rinsing the accumulation of residue from the walls.

2. The rinse structure set forth in claim 1 including a central support connected to the central concave portion, the support offset from the high volume sheet of rinse fluid so that voids in sheet of rinse fluid delivered to the walls are eliminated.

3. The rinse structure as set forth in claim 2 wherein the central support extends axially into the outlet and includes a non-bridging portion at the outlet having a width less than the first diameter.

4. Rinse structure for the solution tank of an agricultural sprayer having walls with inside surfaces subject to accumulation of residue from chemicals, the rinse structure comprising:
   a source of pressurized rinse;
   a rinse tube connected to the pressurized rinse, and including a cylindrical body having an outlet providing a high capacity flow rate along an egress path;
   a deflection member supported within the tank between the walls and having a concave portion intercepting the egress path to provide a continuous high volume sheet of rinse fluid for rinsing the accumulation of residue from the walls;
   a central support connected to the deflection member at a central location of the concave portion, the support offset from the high volume sheet of rinse fluid so that voids in sheet of rinse fluid delivered to the walls are eliminated; and
   wherein the outlet is generally circular and has an outlet diameter, and the support comprises a flat member projecting into the cylindrical body and having an area located within the cylindrical body adjacent the outlet of width less than the outlet diameter to provide an uninterrupted flow of rinse fluid along the concave portion.

5. The rinse structure of claim 1 wherein the rinse tube is connected to a source of low pressure fluid rinse.

6. The rinse structure of claim 1 wherein the rinse tube is supported from an upper area of the solution tank, and the deflection member is concave upwardly.

7. Rinse nozzle structure for the solution tank of an agricultural sprayer having walls with inside surfaces subject to accumulation of residue and a source of pressurized rinse connected to a rinse tube, the rinse nozzle structure comprising:
   a tube having a central bore adapted for connection to the pressurized rinse, the bore defining a generally circular outlet having a diameter providing a high capacity flow rate along an egress path;
   a support member supported within and extending from the bore, the support member located centrally with respect to the bore and having a dimension within the central bore at the circular outlet substantially less than the diameter of the outlet so that the support member is non-bridging at the circular outlet and flow adjacent the bore exits the outlet substantially undeflected;
   a concave deflection member supported from the support member at a location offset from the outlet and having a continuous portion intercepting the egress path to provide a high volume, non-interrupted sheet of rinse fluid for rinsing the accumulation of residue from the walls.

8. The rinse nozzle structure set forth in claim 7 including a connection area between the support member and the deflection member located generally on the axis of the bore and having a length substantially less than the outlet diameter so that deflection of the rinse fluid by the concave deflection member is generally uninterrupted by the connection area.

9. The rinse nozzle structure set forth in claim 7 wherein the outlet diameter is greater than half an inch (12.7 mm) and the concave deflection member has a diameter of at least twice the outlet diameter.

10. The rinse nozzle structure set forth in claim 7 wherein the central bore is adapted for connection to a source of rinse water at a pressure of approximately 20 psi or greater.

11. The rinse nozzle structure set forth in claim 7 wherein the tube comprises a cylindrical member with a mounting end adapted for attachment to a wall of the solution tank.

12. The rinse nozzle structure set forth in claim 11 wherein the mounting end of the cylindrical member is offset several inches from the concave deflection member so that the deflection member is closely adjacent the wall of the solution tank.

13. The rinse nozzle structure set forth in claim 7 wherein the concave deflection member is circular with diameter greater than twice the diameter of the circular outlet and comprises a single non-annular concavity.

14. The rinse nozzle structure set forth in claim 7 wherein the concave deflection member comprises a single non-annular concavity.

* * * * *